(12) United States Patent
Manta et al.

(10) Patent No.: US 9,534,518 B2
(45) Date of Patent: Jan. 3, 2017

(54) LUBRICATING OIL FILTER ASSEMBLY

(75) Inventors: Eugenio Manta, Valdellatorre (IT); Nicola Costa, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 174 days.

(21) Appl. No.: 13/167,985

(22) Filed: Jun. 24, 2011

(65) Prior Publication Data

US 2011/0315112 A1 Dec. 29, 2011

(30) Foreign Application Priority Data

Jun. 24, 2010 (GB) .................................. 1010626.8

(51) Int. Cl.
| | |
|---|---|
| *F01M 11/03* | (2006.01) |
| *F01M 1/02* | (2006.01) |
| *F01M 1/04* | (2006.01) |
| *F01M 5/00* | (2006.01) |
| *F01M 3/04* | (2006.01) |
| *F01M 11/10* | (2006.01) |
| *F01M 9/10* | (2006.01) |
| *F02B 61/04* | (2006.01) |
| *F01M 1/10* | (2006.01) |
| *F01M 11/04* | (2006.01) |
| *B01D 35/18* | (2006.01) |
| *F16N 39/00* | (2006.01) |

(52) U.S. Cl.
CPC ................ *F01M 1/10* (2013.01); *B01D 35/18* (2013.01); *F01M 11/03* (2013.01); *F01M 11/0458* (2013.01); *F01M 2001/1092* (2013.01); *F16N 39/005* (2013.01)

(58) Field of Classification Search
CPC .......... F16N 39/005; F01M 11/03; F01M 1/10; F01M 11/0458; B01D 35/18
USPC ...................................................... 123/196 A
See application file for complete search history.

(56) References Cited

U.S. PATENT DOCUMENTS

| | | | | |
|---|---|---|---|---|
| 3,057,436 | A | * 10/1962 | Jacobson et al. | ............... 184/6.3 |
| 3,453,995 | A | * 7/1969 | Pekar, Jr. et al. | ......... 123/196 R |
| 4,295,964 | A | 10/1981 | Preisler | |
| 4,622,136 | A | * 11/1986 | Karcey | .................... 210/167.09 |

(Continued)

FOREIGN PATENT DOCUMENTS

| | | |
|---|---|---|
| CN | 200993035 Y | 12/2007 |
| EP | 0426884 A1 * | 5/1991 ............. F01M 11/10 |

(Continued)

OTHER PUBLICATIONS

Unknown, Oil Filter, 2006, Wikipedia, p. 1.*

(Continued)

*Primary Examiner* — Lindsay Low
*Assistant Examiner* — Charles Brauch
(74) *Attorney, Agent, or Firm* — Lorenz & Kopf LLP

(57) ABSTRACT

A lubricating oil filter assembly is provided for an internal combustion engine that includes, but is not limited to a body provided with: an oil inlet, an oil outlet, a conduit connecting the oil inlet to the oil outlet, and a chamber suitable for accommodating a filter element, the chamber being in communication with the oil inlet and with the oil outlet. The lubricating oil filter assembly further includes, but is not limited to a valve assembly arranged within the conduit to enable a flow of lubricating oil in dependence of the pressure of the lubricating oil at the oil inlet.

16 Claims, 9 Drawing Sheets

(56) References Cited

U.S. PATENT DOCUMENTS

| | | | | |
|---|---|---|---|---|
| 4,717,472 A * | 1/1988 | Oberg | ............................ | 210/90 |
| 4,875,551 A * | 10/1989 | Lulich | ........................... | 184/6.3 |
| 4,915,852 A * | 4/1990 | Tomlinson | .................... | 210/805 |
| 5,014,820 A * | 5/1991 | Evans | ........................... | 184/6.3 |
| 5,037,539 A | 8/1991 | Hutchins et al. | | |
| 5,722,298 A | 3/1998 | Schwarzbich | | |
| 6,178,934 B1 * | 1/2001 | Hirasawa et al. | ......... | 123/90.11 |
| 6,224,758 B1 | 5/2001 | Jainek et al. | | |
| 6,955,755 B2 * | 10/2005 | Jainek | ........................... | 210/130 |
| 6,997,208 B2 * | 2/2006 | Mack | ........................... | 137/549 |
| 7,182,855 B1 * | 2/2007 | O'Leary | ........................ | 210/90 |
| 7,413,089 B1 * | 8/2008 | Tidwell | ........................ | 210/443 |
| 2003/0173281 A1 * | 9/2003 | Wright et al. | ................ | 210/248 |
| 2003/0178362 A1 * | 9/2003 | Cline | ............................ | 210/443 |
| 2005/0126965 A1 * | 6/2005 | Meddock et al. | ............. | 210/132 |
| 2006/0033328 A1 * | 2/2006 | Skiba et al. | .................... | 285/92 |
| 2006/0096934 A1 | 5/2006 | Weinberger et al. | | |
| 2009/0158732 A1 | 6/2009 | Weisz | | |

FOREIGN PATENT DOCUMENTS

| | | | |
|---|---|---|---|
| JP | H06212989 A | 8/1994 | |
| RU | 2064594 C1 | 7/1996 | |

OTHER PUBLICATIONS

Unkown, Oil Filter Dating, 2006, Wayback Machine, p. 1.*
Office Action issued Jul. 11, 2014 in CN Application No. 201110173704.5.
Chinese Patent Office, Chinese Office Action for Chinese Application No. 201110173704.5, dated Mar. 4, 2015.

* cited by examiner

LUBRICATING OIL FILTER ASSEMBLY

CROSS-REFERENCE TO RELATED APPLICATION

This application claims priority to British Patent Application No. 1010626.8, filed Jun. 24, 2010, which is incorporated herein by reference in its entirety.

TECHNICAL FIELD

The technical invention relates to a filter assembly employed for filtering a lubricating oil of an internal combustion engine of a motor vehicle, principally the lubricating oil which is fed to a turbocharger of a turbocharged internal combustion engine.

BACKGROUND

It is known that the internal combustion engines comprise a lubrication circuit suitable for lubricating the rotating or sliding components of the engine. This lubrication circuit generally comprises an oil pump driven by the engine, which draws lubricating oil from a sump and delivers it under pressure through a main oil gallery that is realized in the cylinder block. The main oil gallery is connected via respective pipes to a plurality of exit holes for lubricating crankshaft bearings (main bearings and big-end bearings), camshaft bearings operating the valves, tappets, and the like.

The lubrication circuit of the turbocharged internal combustion engines further comprises a feeding pipe connecting the main oil gallery to the turbocharger, so as to lubricate the bearings of the rotating shaft connecting the compressor and the turbine of the turbocharger. Due to the very small clearances between the rotating shaft and its bearings, the lubricating oil fed to the turbocharger should be substantially devoid of contaminants, in order to prevent any bearing seizure. For this reason, it is known to locate an additional lubricating oil filter in the feeding pipe connecting the main oil gallery to the turbocharger.

A lubricating oil filter of this kind is realized by integrating a small filter element directly inside a banjo-bolt that is employed for joining the turbocharger feeding pipe to the main oil gallery of the cylinder block. This filter element is currently designed to be effective for the entire life of the internal combustion engine, in order to realize a "for-life filter". Nonetheless, a clogging of the filter element may occur anyway, due for example to unusually big contaminant particles coming from the lubrication circuit. A clogging of the filter element is very dangerous because it reduces the flow rate of the lubricating oil fed to the turbocharger, thereby increasing the probability of a bearing seizure. The above mentioned "banjo-bolt solution" is unable to handle a clogging of the filter element, so that the turbocharger can be heavily damaged.

In view of the above, it is at least on object to solve this drawback, with a simple, rational and rather inexpensive solution. In addition, other objects, desirable features and characteristics will become apparent from the subsequent summary and detailed description, and the appended claims, taken in conjunction with the accompanying drawings and this background.

SUMMARY

An embodiment provides a lubricating oil filter assembly for an internal combustion engine, which comprises a body provided with an oil inlet, an oil outlet, a conduit connecting the oil inlet to the oil outlet, and a chamber suitable for accommodating a filter element, the chamber being in communication with the oil inlet and with the oil outlet.

The lubricating oil filter assembly further comprises a movable valve member and a spring. The movable valve member is located in the conduit, so that the pressure of the lubricating oil at the oil inlet pushes the valve member towards an opening position, in which the valve member keeps said conduit open. The spring is arranged so as to push the valve member towards a closing position, in which the valve member keeps said conduit closed. With this solution, if a clogging of the filter element occurs, the pressure of the lubricating oil at the oil inlet increases and causes the valve member to open the conduit connecting the oil inlet to the oil outlet, so that the lubricating oil bypasses the filter element, thereby reaching the devices located downstream the lubricating oil filter assembly. According to an embodiment, the above mentioned conduit bypasses the chamber. This solution simplifies the realization of the body of the lubricating filter assembly.

According to an alternative embodiment, the chamber is located in the conduit, and the valve member is the filter element accommodated in the chamber, which is movable between the closing position, in which it hydraulically separates the oil inlet from the oil outlet of the body, and the opening position, in which it opens a passage that directly connects the oil inlet to the oil outlet. This solution advantageously allows a reduction in the dimensions of the body, thereby simplifying the packaging of the entire lubricating oil filter assembly.

According to another an embodiment, the lubricating oil filter assembly comprises a housing that accommodates the above mentioned body. The housing is provided with an inlet communicating with the oil inlet of the body, and with an outlet communicating with the oil outlet of the body. This solution has the advantage that the body, the filter element, the valve member and the spring are arranged so as to form a single removable cartridge, which can be entirely demounted from the housing, thereby simplifying the maintenance of the lubricating oil filter assembly.

According to an embodiment, the housing comprises a cup-shaped body and a bonnet, which is fixed to said cup-shaped body so as to enclose the body. This solution generally simplifies the realization of the mentioned housing.

According to an alternative embodiment of the invention, the lubricating oil filter assembly comprising a housing for the filter element. This housing is provided with an internal chamber and with an inlet and an outlet communicating with the internal chamber. The filter element is accommodated inside the internal chamber of the housing, so as to hydraulically separate the inlet from the outlet. The housing is accommodated inside the chamber of the body, so that the oil inlet of the body communicates with the inlet of the housing and the oil outlet of the body communicates with the outlet of the housing. This solution has the advantage that the housing and the filter element are arranged so as to form a removable cartridge, which can be demounted from the body independently from the valve member and the spring, thereby allowing a simple replacing of the sole filter element. As a consequence, this removable cartridge can be even designed as a disposable part.

According to another embodiment, the housing comprises a portion jutting out from the body. This solution simplifies the disassembly and the reassembly of the removable cartridge. According to another embodiment, the housing can be a banjo-bolt. As a matter of fact, a banjo-bolt is a cheap and largely available component, by means of which it is possible to realize a removable cartridge very simple and economic.

A lubricating oil filter assembly according to any of the preceding embodiment can further comprise a sensor for detecting the movable valve member in opening position. This sensor can be connected to an Engine Control Unit (ECU) of a vehicle on which the lubricating oil filter assembly is mounted, so as to indicate to the ECU and/or to the driver that the filter element is clogged.

Another embodiment provides the lubricating oil filter assembly disclosed above, which further comprises the filter element accommodated in the chamber of the body, so as to hydraulically separate the oil inlet from the oil outlet.

Still another embodiment provides an internal combustion engine comprising a lubrication circuit and the lubricating oil filter assembly disclosed above, which is located in the lubrication circuit. In this way, the lubricating oil filter assembly can be effectively used for filtering the lubricating oil upstream a critical device of the internal combustion engine. According to another of this embodiment, the lubricating oil filter assembly is located in a feeding line of the lubrication circuit, which is provided for delivering the lubricating oil into a turbocharger. This advantageously allows protection of the turbocharger against the bearing seizure.

According to another embodiment, the lubricating oil filter assembly is fixed to a cylinder block of the internal combustion engine. This embodiment has the advantage of preserve the original layout of the internal combustion engine. Alternatively, the lubricating oil filter assembly can be fixed to a housing of the turbocharger. This embodiment has the advantage that a single kind of lubricating oil filter assembly can be employed for different kinds of internal combustion engine.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
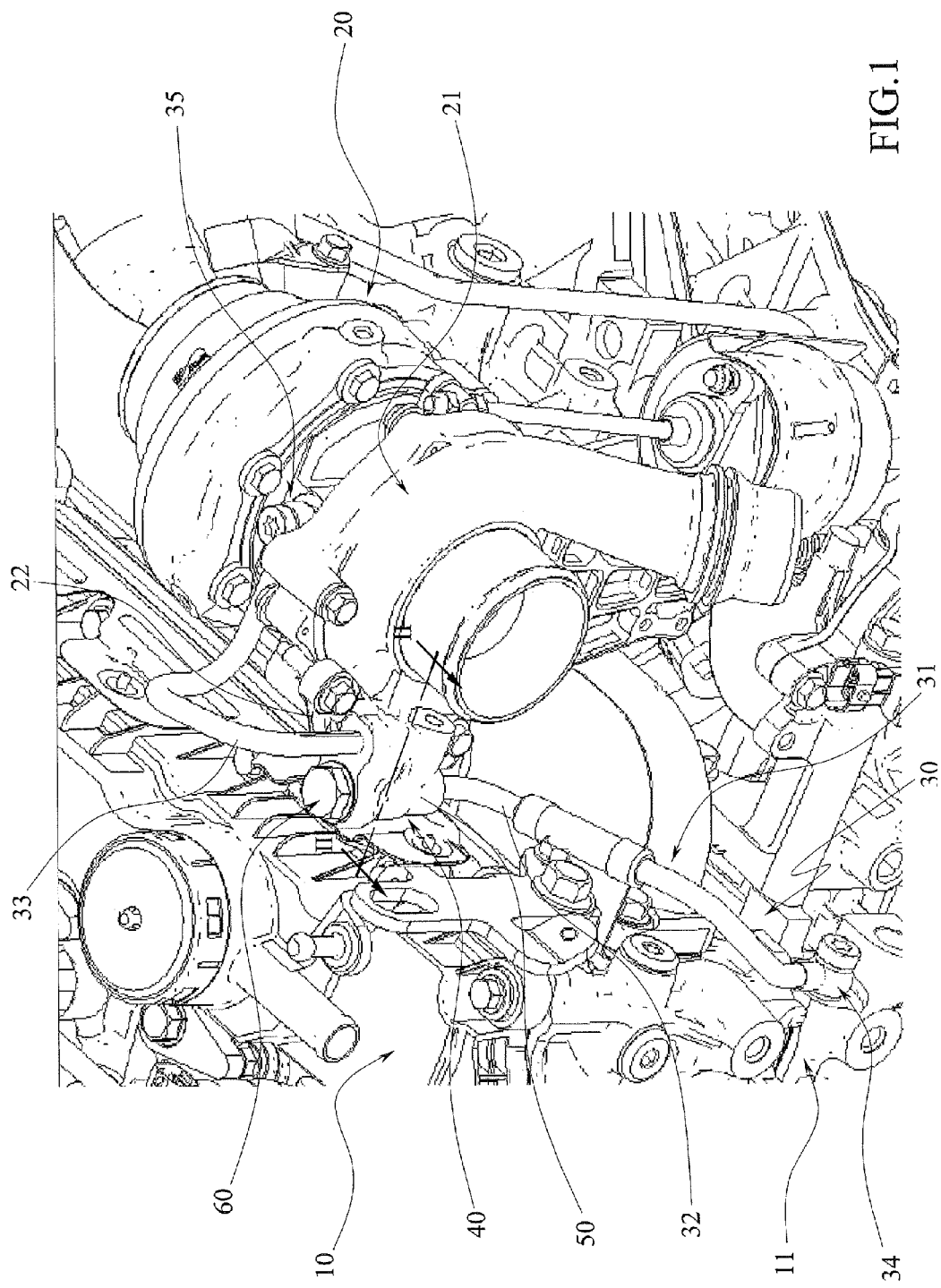
FIG. 1 is a partial view of a turbocharged internal combustion engine equipped with a lubricating oil filter assembly according to an embodiment.

FIG. 1 shows a conventional internal combustion engine 10 equipped with a turbocharger 20. The internal combustion engine 10 is further conventionally equipped with a lubrication circuit 30, which is only partially visible in the FIG. 1. The lubrication circuit 30 generally comprises an oil pump driven by the internal combustion engine 10, which draws a lubricating oil from a sump and delivers it under pressure through a main oil gallery that is realized in the cylinder block 11 of the internal combustion engine 10.

The main oil gallery is connected via respective pipes to a plurality of exit holes for lubricating crankshaft bearings (main bearings and big-end bearings), camshaft bearings operating the valves, tappets, and the like. The oil pump, the sump, the main oil gallery as well as the pipes connecting the main oil gallery to the above mentioned exit holes are not shown, because they are of conventional kind and therefore widely known to the skilled man.

The lubrication circuit 30 further comprises a feeding line 31 that hydraulically connects the main oil gallery of the cylinder block 11 to the turbocharger 20, so as to lubricate the bearings of the rotating shaft connecting the compressor and the turbine of the turbocharger. The compressor, the turbine, the rotating shaft as well as the above mentioned bearings of the turbocharger 20 are not shown, because they are of conventional kind and therefore widely known to one of ordinary skilled in the art.

In order to filter the lubricating oil to be fed into the turbocharger 20, a lubricating oil filter assembly 40 is located in the feeding line 31. The lubricating oil filter assembly 40 comprises a body 50 and a removable filter cartridge 60 coupled to the body 50.

Figure 2:
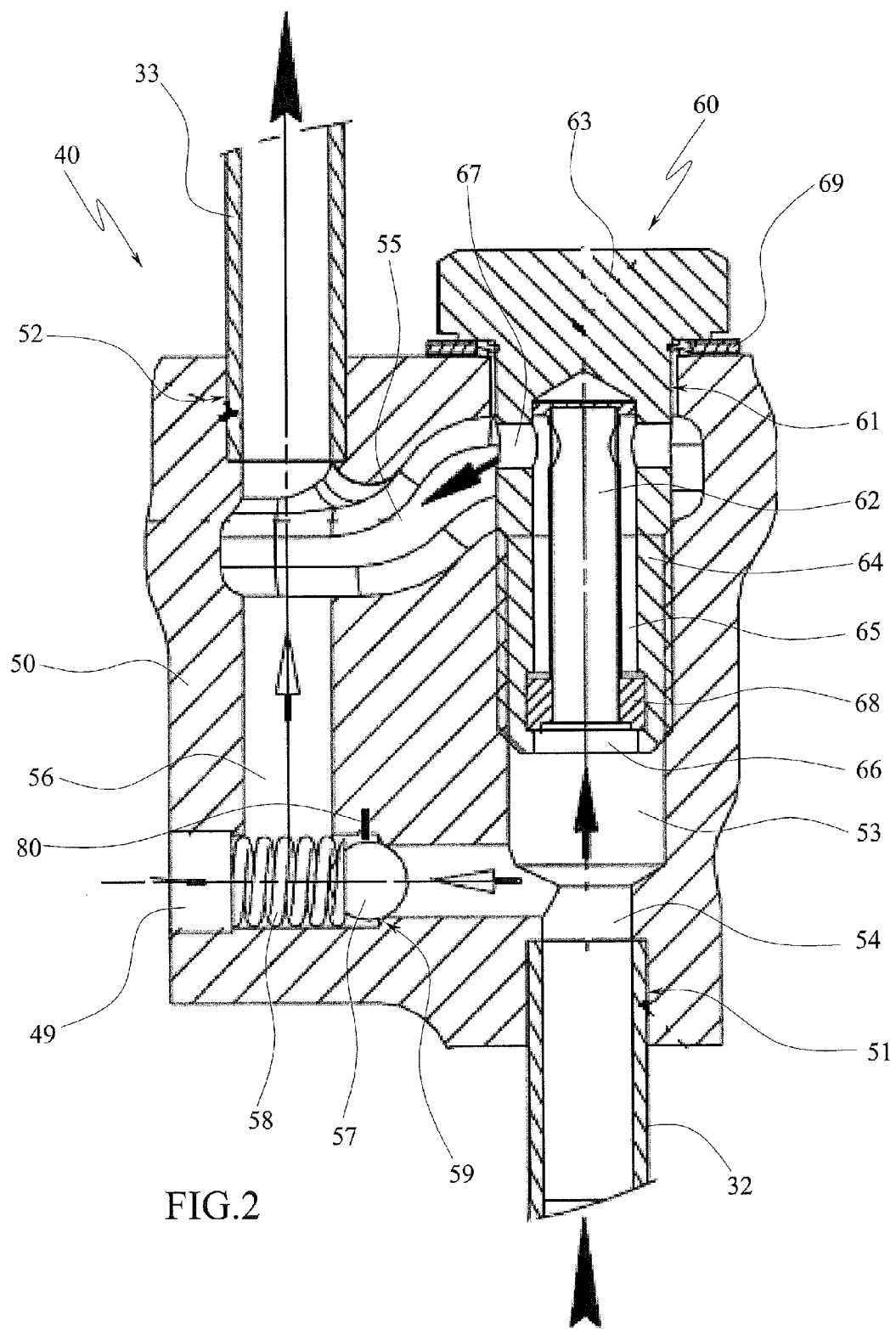
FIG. 2 is a section II-II indicated in FIG. 1.

As shown in FIG. 2, the body 50 is realized in a single casting comprising an oil inlet 51, an oil outlet 52 and a cylindrical internal chamber 53. The upper side of the chamber 53 is open to the exterior of the body 50, while its lateral side is internally threaded. The oil inlet 51 communicates with the chamber 53 through a machined hole 54 that leads to the bottom side of the chamber 53. The oil outlet 52 communicates with the chamber 53 through a rough channel 55 that leads to the lateral side of the chamber 53. The removable filter cartridge 60 comprises a housing 61 containing a filter element 62.

The housing 61 is defined by a conventional banjo-bolt having an head portion 63, a threaded stem 64, and an internal chamber 65 communicating with the exterior of the housing 61 through an inlet 66, realized in the bottom side of the stem 64, and an outlet 67, realized in the lateral side of the stem 64.

The filter element 62 has a cylindrical shape and is accommodated inside the internal chamber 65 of the housing 61, so as to hydraulically separate the inlet 66 from the outlet 67, with the aid of a gasket 68. The stem 64 of the housing 61 is screwed into the chamber 53 of the body 50, while the head portion 63 juts out from the body 50. A gasket 69 is interposed between the head portion 63 and the body 50, so as to guarantee the hermetical closure of the chamber 53.

As long as the removable filter cartridge 60 is coupled with the body 50, the oil inlet 51 of the body 50 communicates with the inlet 66 of the housing 61, while the oil outlet 52 of the body 50 communicates with the outlet 67 of the housing 61. The body 50 further comprises an internal conduit 56 connecting the oil inlet 51 to the oil outlet 52, bypassing the chamber 53. The body 50 further accommodates a movable valve member 57, in this case a valve ball, which is located in the conduit 56, and a spring 58, which pushes the valve member 57 against a valve seat 59, so as to hermetically close the conduit 56.

The valve member 57, the spring 58 and the valve seat 59 are arranged so that the pressure of the lubricating oil at the oil inlet 51 pushes the valve member 57 against the spring 58, so as to open the conduit 56. The spring 58 is preloaded by means of a plug 49 that is screwed into a threaded hole, through which the valve member 57 and the spring 58 are mounted into the conduit 56.

As shown in FIG. 1, the body 50 of the lubricating oil filter assembly 40 is fixed to a housing 21 of the compressor of the turbocharger 20, by means of a bracket 22. The feeding line 31 comprises a first rigid pipe 32 connecting the main gallery of the cylinder block 11 to the oil inlet 51 of the body 50, and a second rigid pipe 33 connecting the oil outlet 52 of the body 50 to a lubricating oil inlet of the turbocharger 20.

In greater details, an extremity of the first rigid pipe 32 is connected to the main gallery of the cylinder block 11 by means of a conventional banjo fitting 34, while the opposite extremity of the first rigid pipe 32 is brazed into the oil inlet 51 of the body 50 (see FIG. 2). Similarly, an extremity of the second rigid pipe 33 is brazed into the oil outlet 52 of the body 50, while the opposite extremity of the second rigid pipe 33 is connected to the lubricating oil inlet of the turbocharger 20 by means of another conventional banjo fitting 35. During the operation of the internal combustion engine 10, the lubricating oil flows in the feeding line 31 from the main oil gallery of the cylinder block 11 towards the turbocharger 20, thereby passing inside the lubricating oil filter assembly 40.

As long as the filter element 62 is sufficiently clean, the pressure of the lubricating oil at the oil inlet 51 is unable to overcome the preload of the spring 58, so that the valve member 57 keeps the conduit 56 closed. As a consequence, the lubricating oil is forced to flow through the filter element 62. Conversely, if a clogging of the filter element 62 occurs, the pressure of the lubricating oil at the oil inlet 51 increases and causes the valve member 57 to open the conduit 56, so that the lubricating oil bypasses the filter element 62, thereby reaching the turbocharger 20 anyway. As a matter of fact, the valve member 57 opens the conduit 56 once the pressure of the lubricating oil at the oil inlet 51 exceeds the preload of the spring 58.

A sensor 80 is provided for detecting the valve member 57 in opening position. Subsequently, the removable filter cartridge 60 can be unscrewed from the body 50, so as to allow the replacing of the clogged filter element 62.

Figure 3:
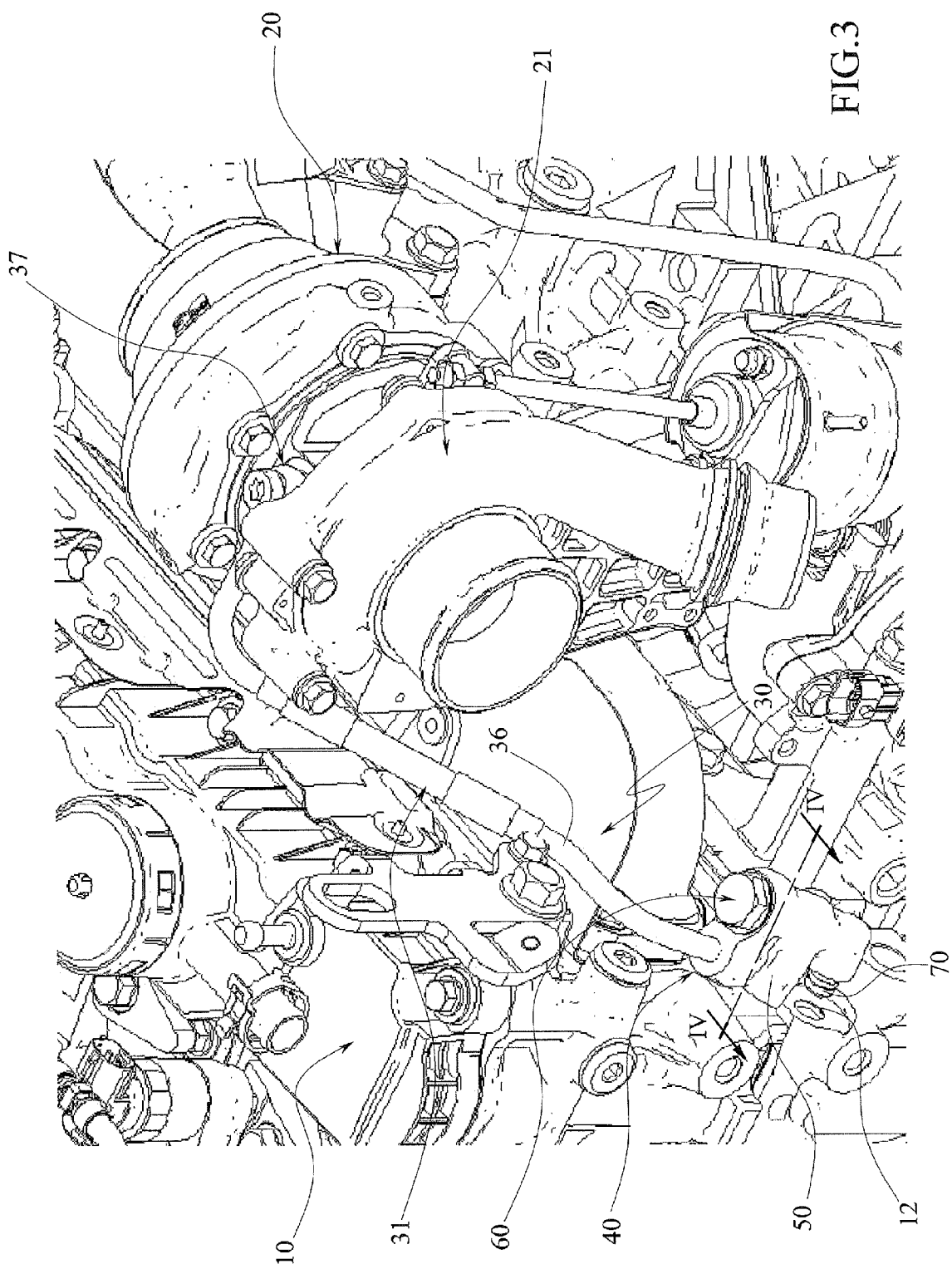
FIG. 3 is a partial view of a turbocharged internal combustion engine equipped with a lubricating oil filter assembly according to another embodiment.
Figure 4:
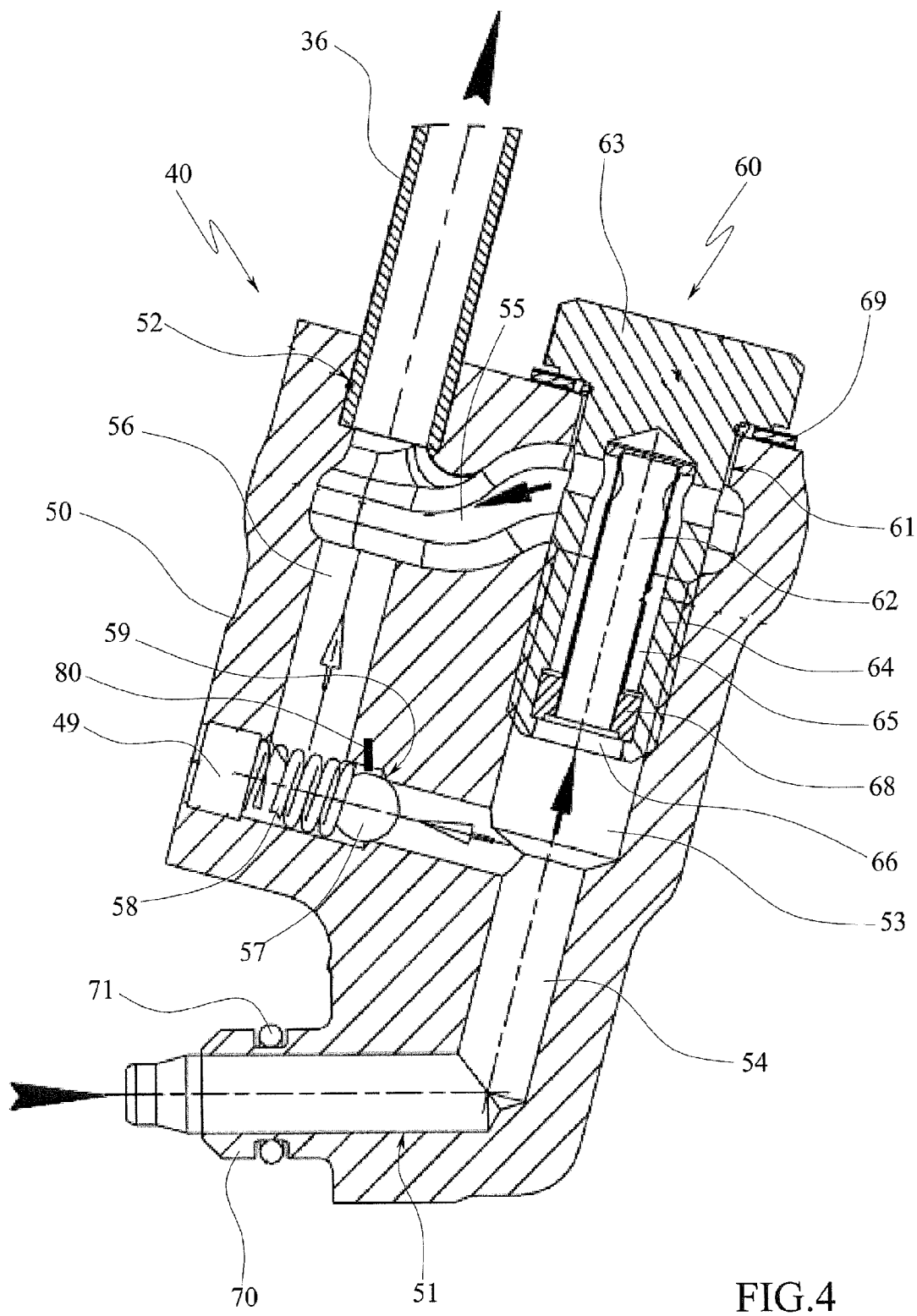
FIG. 4 is a section IV-IV indicated in FIG. 3.

FIG. 3 and FIG. 4 show a lubricating oil filter assembly 40 according to another embodiment of the invention, which is destined to be directly fixed to the cylinder block 11 of the internal combustion engine 10. As a matter of fact, this lubricating oil filter assembly 40 differs from the preceding one only in that the body 50 comprises an hollow protruding nose 70, which defines the oil inlet 51 and which is shaped so as to be directly inserted into an hole 12 of the cylinder block 11, which leads into the main oil gallery. A gasket 71 is interposed between the protruding nose 70 and the hole 12, so as to guarantee the hermetical closure of the main oil gallery.

In the present embodiment, the feeding line 31 is defined by a single rigid pipe 36 having a first extremity brazed into the oil outlet 52 of the body 50, and a second extremity connected to the lubricating oil inlet of the turbocharger 20 by means of the conventional banjo fitting 37. In use, the lubricating oil filter assembly 40 according to the present embodiment operates the same way as that previously described.

Figure 6:
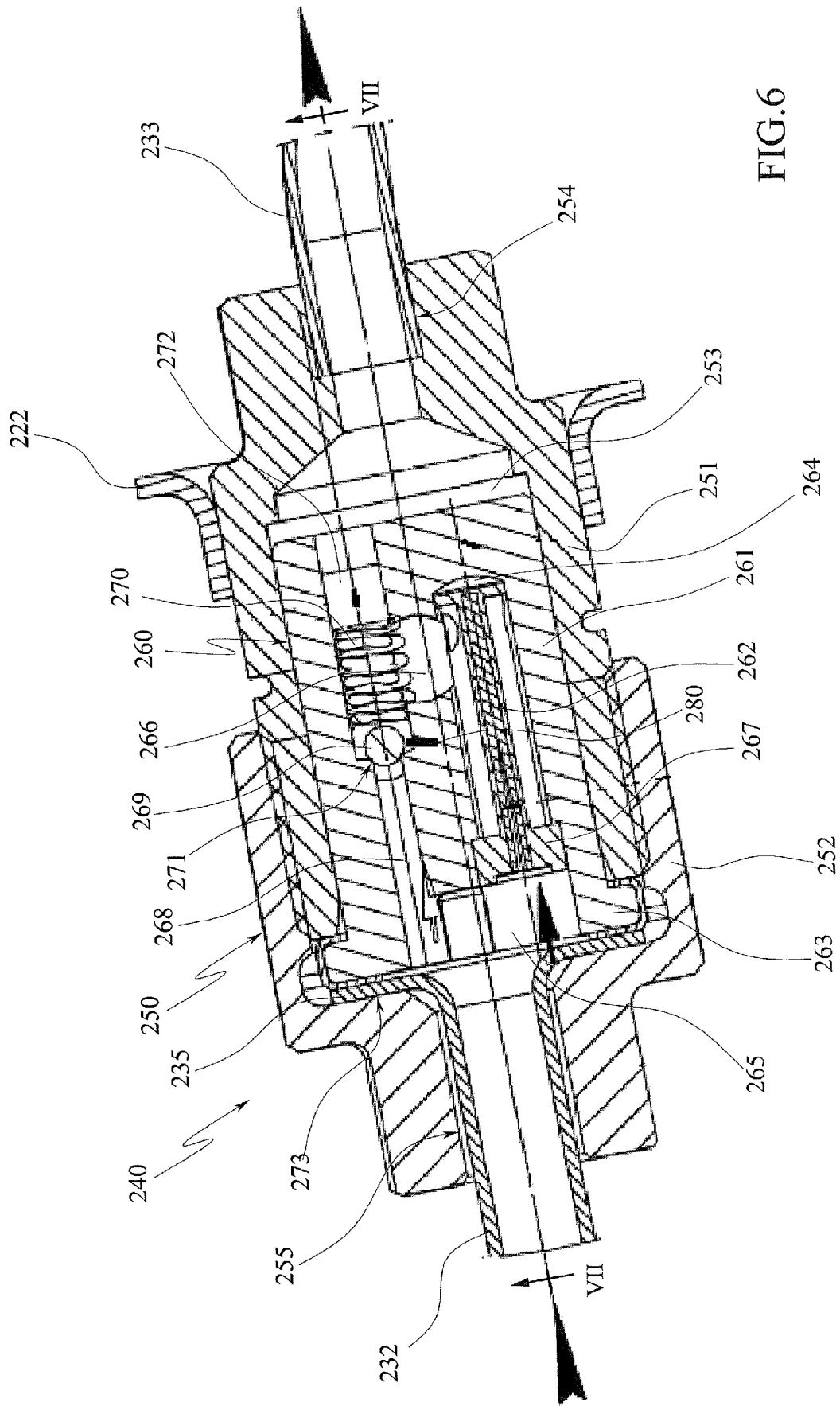
FIG. 6 is a section VI-VI indicated in FIG. 5.

FIG. 6 shows a lubricating oil filter assembly 240 according to another embodiment. The lubricating oil filter assembly 240 comprises an external housing 250 enclosing a removable filter cartridge 260. The housing 250 comprises a cup-shaped body 251 and a bonnet 252, which is screwed to the cup-shaped body 251 so as to define a closed internal chamber 253, in which the removable filter cartridge 260 is accommodated.

While the cup-shaped body 251 comprises an outlet 254, the bonnet 252 comprises an inlet 255 coaxially aligned with the outlet 254. Both the inlet 255 and the outlet 254 communicate with the internal chamber 253. The removable filter cartridge 260 comprises a body 261 and a filter element 262 associated to said body 261.

Figure 7:
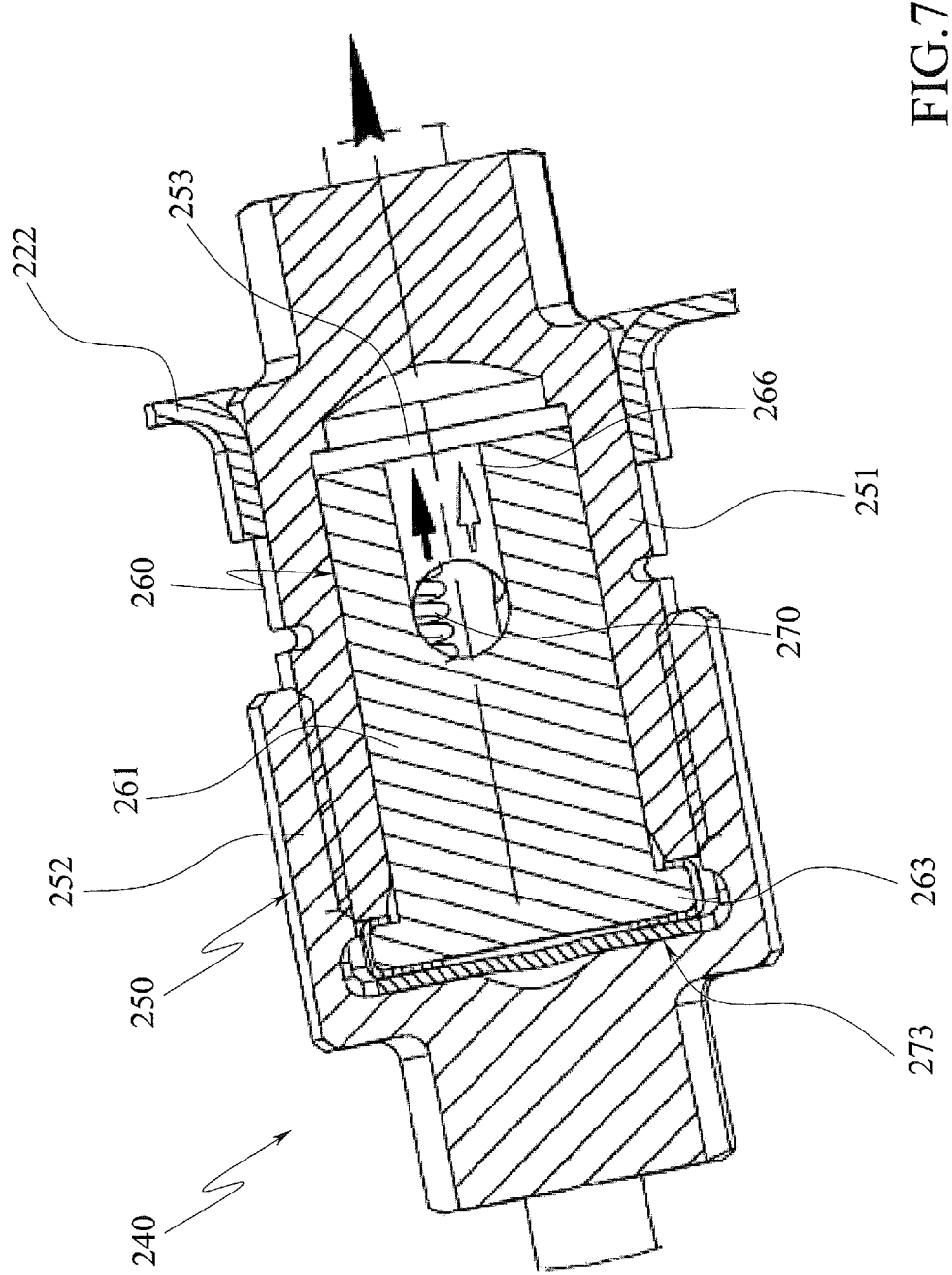
FIG. 7 is a section VII-VII indicated in FIG. 6.

The body 261 has a cylindrical shape with a protruding flange 263 located at a first extremity. The body 261 further comprises an internal chamber 264 communicating with the exterior of the body 261 through an oil inlet 265, realized at the first extremity of the body 261, and an oil outlet 266, realized at the opposite extremity of the body 261, as clearly shown in FIG. 7.

The filter element 262 has a cylindrical shape and is accommodated inside the chamber 264 of the body 261, so as to hydraulically separate the oil inlet 265 from the oil outlet 266, with the aid of a gasket 267. The body 261 comprises an additional conduit 268 connecting the oil inlet 265 to the oil outlet 266.

The body 261 further accommodates a movable valve member 269, in this case a valve ball, which is located in the conduit 268, and a spring 270, which pushes the valve member 269 against a valve seat 271, so as to hermetically close the conduit 268. The valve member 269, the spring 270 and the valve seat 271 are arranged so that the pressure of the lubricating oil at the oil inlet 265 pushes the valve member 269 against the spring 270, so as to open the conduit 268. The spring 270 is preloaded by means of a plug 272 screwed into a threaded hole of the body 261, through which the valve member 269 and the spring 270 are mounted inside the conduit 268. The body 261 is inserted into the cup-shaped body 251 of the housing 250, so as to be completely enclosed inside the internal chamber 253, with the protruding flange 263 resting against the perimetrical edge of the opening of the cup shaped-body 251. As long as the removable filter cartridge 260 is coupled with the housing 250, the inlet 255 of the housing 250 communicates with the oil inlet 265 of the body 261, while the outlet 254 of the housing 250 communicates with the oil outlet 266 of the body 261.

Figure 5:
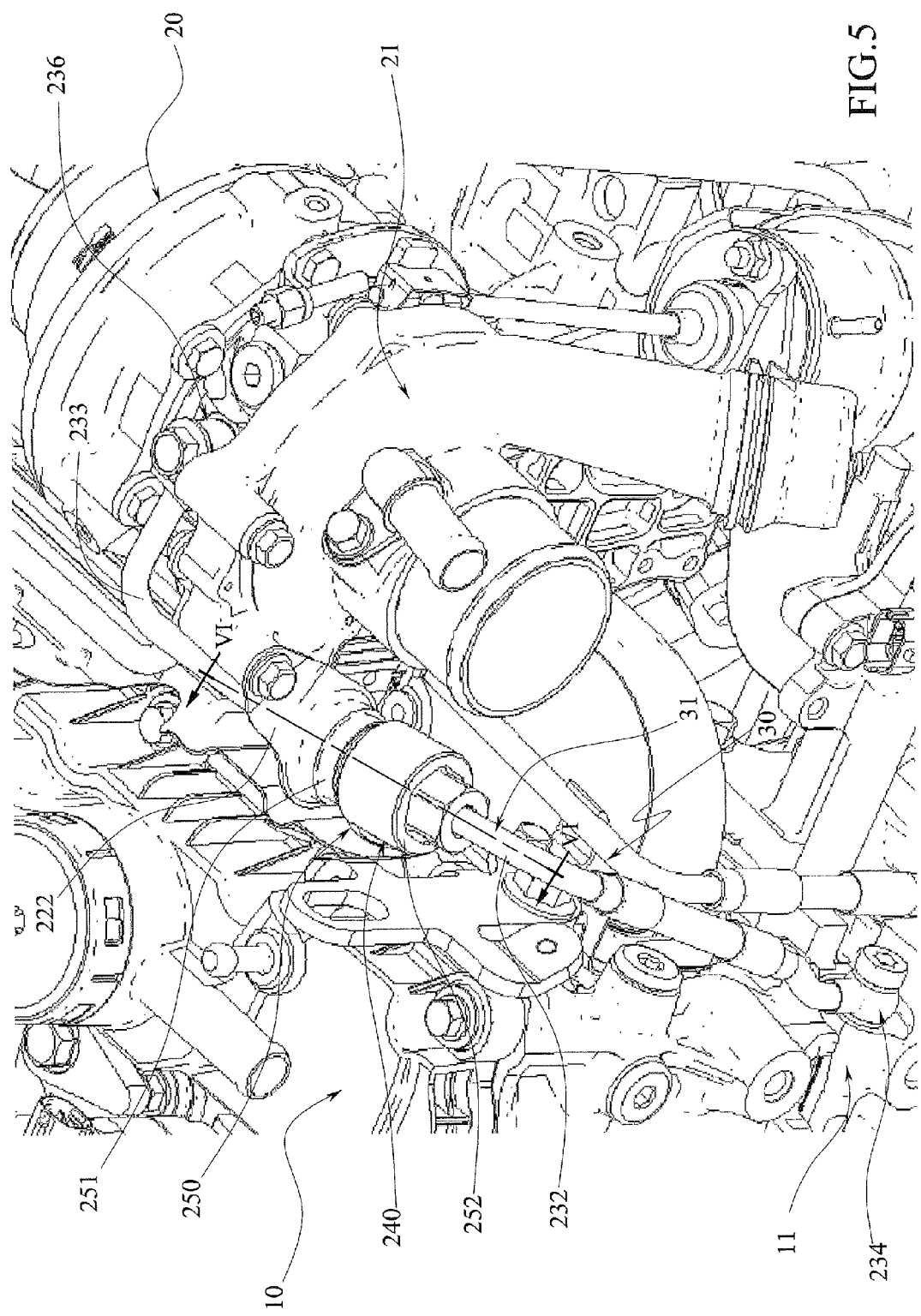
FIG. 5 is a partial view of a turbocharged internal combustion engine equipped with a lubricating oil filter assembly according to a further embodiment.

As shown in FIG. 5, the housing 250 of the lubricating oil filter assembly 240 is fixed to the housing 21 of the compressor of the turbocharger 20, by means of a bracket 222. The feeding line 31 comprises a first rigid pipe 232 connecting the main gallery of the cylinder block 11 to the inlet 255 of the housing 250, and a second rigid pipe 233 connecting the outlet 254 of the housing 250 to the lubricating oil inlet of the turbocharger 20. In greater detail, an extremity of the first rigid pipe 232 is connected to the main gallery of the cylinder block 11 by means of a conventional banjo fitting 234, while the opposite extremity of the first rigid pipe 232 is inserted into the inlet 255 of the housing 250.

As shown in FIG. 6, this opposite extremity of the first rigid pipe 232 comprises a flange 235 that is interposed between an internal shoulder 273 of the bonnet 252 and the protruding flange 263 of the body 261 of the removable filter cartridge 260. The first rigid pipe 232 is inserted into the inlet 255 of the housing 250 with a certain clearance, so that the bonnet 252 can axially move along the first rigid pipe 232.

When the bonnet 252 is screwed to the cup-shaped body 251, the shoulder 273 presses the protruding flange 263 of the body 261 of the removable filter cartridge 260 between the flange 235 of the first rigid pipe 232 and the edge of the opening of the cup-shaped body 251, so as to guarantee the hermetical closure of the housing 250, eventually with the aid of a gasket. Conversely, the second rigid pipe 233 has an extremity that is brazed into the outlet 254 of the housing 250, and an opposite extremity that is connected to the lubricating oil inlet of the turbocharger 20 by means of another conventional banjo fitting 236.

During the operation of the internal combustion engine 10, as long as the filter element 262 is sufficiently clean, the pressure of the lubricating oil at the inlet 255 is unable to overcome the preload of the spring 270, so that the valve member 269 keeps the conduit 268 closed. As a consequence, the lubricating oil is forced to flow trough the filter element 262. Conversely, if a clogging of the filter element 262 occurs, the pressure of the lubricating oil at the inlet 255 increases and causes the valve member 269 to open the conduit 268, so that the lubricating oil bypasses the filter element 262, to thereby reaching the turbocharger 20 anyway. As a matter of fact, the valve member 269 opens the conduit 268 once the pressure of the lubricating oil at the inlet 255 exceeds the preload of the spring 270. A sensor 280 is provided for detecting the valve member 269 in opening position. Subsequently, the bonnet 252 of the housing 250 can be unscrewed from the cup-shaped body 251, allowing the removable filter cartridge 260 to be removed, so as to replace the clogged filter element 262 with a clean one.

Figure 8:
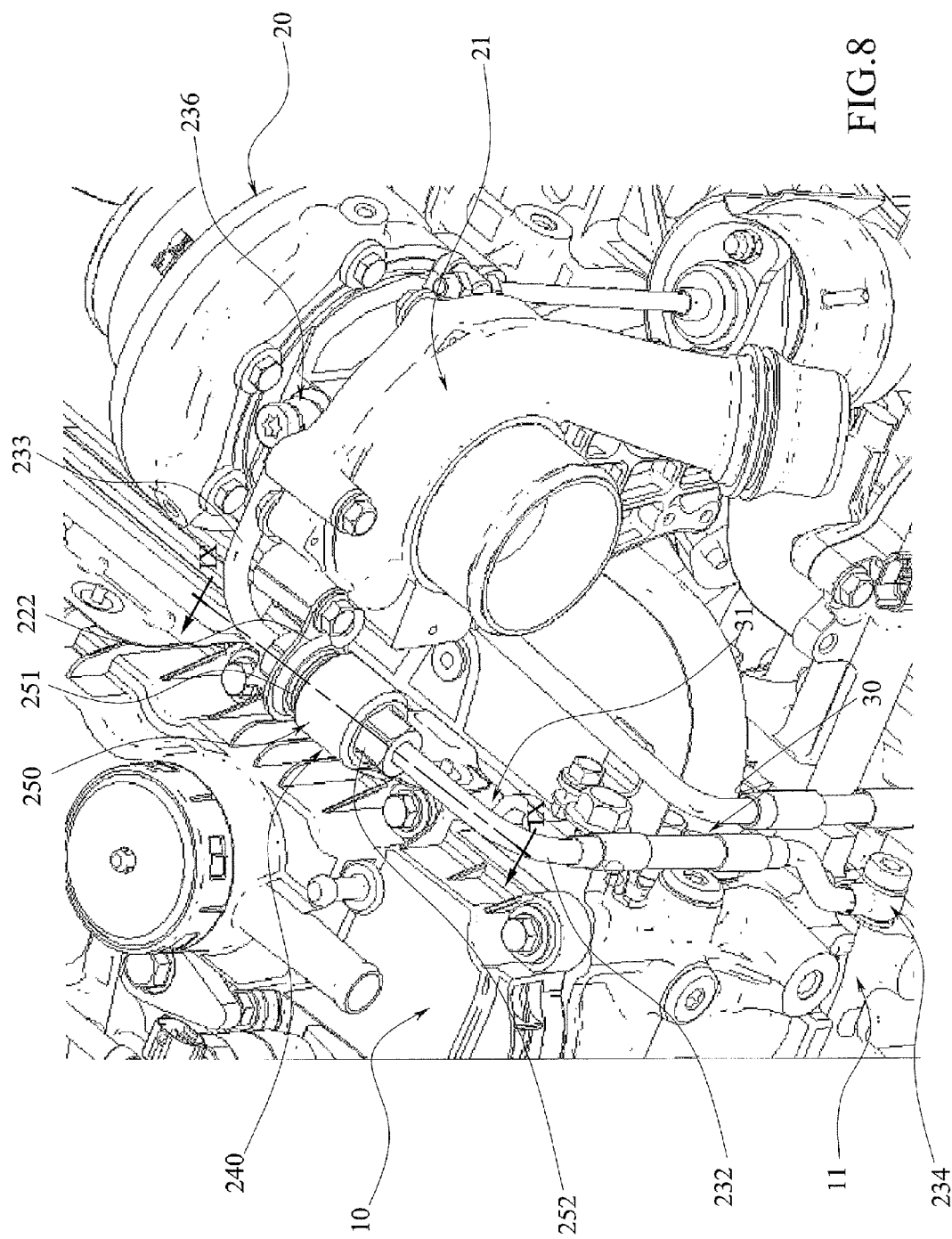
FIG. 8 is a partial view of a turbocharged internal combustion engine equipped with a lubricating oil filter assembly according to still another embodiment.
Figure 9:
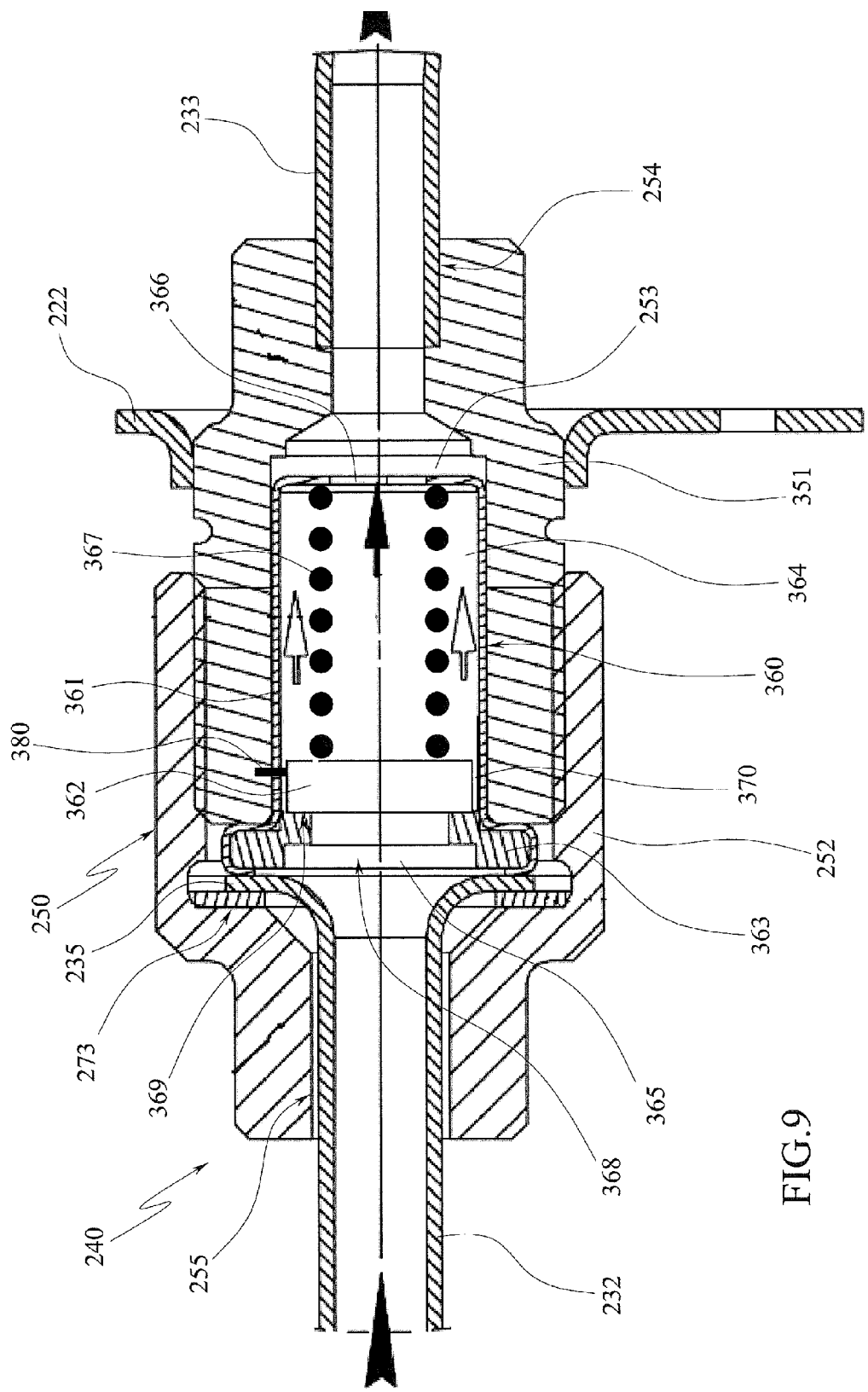
FIG. 9 is a section IX-IX indicated in FIG. 8.

FIG. 8 and FIG. 9 show a lubricating oil filter assembly 240 according to another embodiment, which differs from the last one, only in that the removable filter cartridge 260, is replaced by a removable filter cartridge 360 having a different design. As shown in FIG. 9, the removable filter cartridge 360 comprises a body 361 containing a filter element 362.

The body 361 has a cylindrical shape with a protruding flange 363 located at a first extremity. The body 361 further comprises an internal chamber 364 communicating with the exterior of the body 361 through an oil inlet 365, realized at the first extremity of the body 361, and an oil outlet 366, which is realized at the opposite extremity of the body 361.

The chamber 364, the oil inlet 365 and the oil outlet 366 define a single conduit globally indicated as 368. The filter element 362 is accommodated inside the chamber 364 of the body 361, and is pushed by a spring 367 against a valve seat 369 so as to hydraulically close the oil inlet 365 with respect to the oil outlet 366. The filter element 362, the spring 367 and the valve seat 369 are arranged so that the pressure of the lubricating oil at the oil inlet 365 pushes the filter element 362 against the spring 367, so as to open a passage 370 that hydraulically connects the oil inlet 365 to the oil outlet 366. In particular, this passage 370 is provided by a clearance between the lateral side of the filter element 362 and the lateral surface of the chamber 364.

The body 361 is inserted into the cup-shaped body 251 of the housing 250, so as to be completely enclosed inside the internal chamber, with the protruding flange 363 resting against the perimetrical edge of the opening of the cup-shaped body 251. As long as the removable filter cartridge 360 is coupled with the housing 250, the inlet 255 of the housing 250 communicates with the oil inlet 365 of the body 361, while the outlet 254 of the housing 250 communicates with the oil outlet 366 of the body 261. In this way, as long as the filter element 362 is sufficiently clean, the pressure of the lubricating oil at the inlet 255 is unable to overcome the preload of the spring 367, so that the filter element 362 keeps the oil inlet 365 closed. As a consequence, the lubricating oil is forced to flow trough the filter element 362. Conversely, if a clogging of the filter element 362 occurs, the pressure of the lubricating oil at the oil inlet 355 increases and causes the filter element 362 to open the oil inlet 365, so that the lubricating oil bypasses the filter element 362, to thereby reaching the turbocharger 20 anyway.

As a matter of fact, the filter element 362 works also as a valve member, which keeps the first opening 355 in direct communication with the second opening 356, once the pressure of the lubricating oil at the oil inlet 355 exceeds the preload of the spring 367. A sensor 380 is provided for detecting the filter element 362 in opening position.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the forgoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and in their legal equivalents.

What is claimed is:

1. A lubricating oil filter assembly for an internal combustion engine, comprising:
   an oil inlet;
   an oil outlet;
   a conduit connecting the oil inlet to the oil outlet;
   a chamber located in the conduit suitable for accommodating a filter element, the chamber in communication with the oil inlet and with the oil outlet;
   a valve member including the filter element located in the conduit, wherein the valve member is movable between a closing position that hydraulically separates the oil inlet from the oil outlet, and has an opening position that reveals a passage directly connecting the oil inlet to the oil outlet so that the pressure of the lubricating oil inlet pushes the valve member towards the opening position;
   and
   a spring arranged so as to push the valve member towards a closing position;
   wherein the conduit is configured to bypass the chamber such that a bypass pathway is formed internal to the lubricating oil filter assembly.

2. The lubricating oil filter assembly according to claim 1, further comprising an housing that accommodates a body, said housing comprising an inlet communicating with the oil inlet of the body, and with an outlet communicating with the oil outlet of the body.

3. The lubricating oil filter assembly according to claim 2, wherein the housing comprises a cup-shaped body and a bonnet, which is fixed to said cup-shaped body so as to enclose the body.

4. The lubricating oil filter assembly according to claim 1, further comprising a housing for the filter element, the housing provided with an internal chamber and with an inlet and an outlet communicating with the internal chamber, the filter element accommodated inside the internal chamber of the housing so as to hydraulically separate the inlet from the outlet, the housing accommodated inside the chamber of a body, so that the oil inlet of the body communicates with the inlet of the housing and the oil outlet of the body communicates with the outlet of the housing.

5. The lubricating oil filter assembly according to claim 4, wherein the housing comprises a portion jutting from the body.

6. The lubricating oil filter assembly according to claim 4, wherein the housing is a banjo-bolt.

7. The lubricating oil filter assembly according to claim 1, comprising a sensor configured to detect the valve member in the open position.

8. The lubricating oil filter assembly according to claim 1, further comprising the filter element accommodated in the chamber of a body so as to hydraulically separate the oil inlet from the oil outlet.

9. An internal combustion engine comprising:
   a lubrication circuit; and
   a lubricating oil filter assembly located in the lubrication circuit, the lubricating oil filter assembly comprising:
      an oil inlet;
      an oil outlet;
      a conduit connecting the oil inlet to the oil outlet;
      a chamber located in the conduit suitable for accommodating a filter element, the chamber in communication with the oil inlet and with the oil outlet; and
      a valve assembly including the filter element arranged within the conduit including a spring that is arranged so as to bias the valve assembly towards a closing position that hydraulically separates the oil inlet from the oil outlet such that the lubricating oil does not flow therethrough when the lubricating oil is at the first pressure; the valve assembly movable to an opening position that reveals a passage directly connecting the oil inlet to the oil outlet so that the pressure of the lubricating oil inlet pushes the valve member towards the opening position such that the lubricating oil flows therethrough when the lubricating oil at the inlet is at a higher pressure;
      wherein the conduit is configured to bypass the chamber such that a bypass pathway is formed internal to the lubricating oil filter assembly.

10. The internal combustion engine according to claim 9, wherein the lubricating oil filter assembly is located in a feeding line of the lubrication circuit, which is provided for delivering the lubricating oil into a turbocharger.

11. The internal combustion engine according to claim 10, wherein the lubricating oil filter assembly is fixed to a cylinder block of the internal combustion engine.

12. The internal combustion engine according to claim 10, wherein the lubricating oil filter assembly is fixed to a housing of the turbocharger.

13. The internal combustion engine according to claim 9, wherein the valve assembly comprises:
   a valve member located in the conduit so that the pressure of the lubricating oil at the oil inlet pushes the valve member towards an opening position in which the valve member keeps said conduit in an open position.

14. The internal combustion engine according to claim 9, further comprising a housing that accommodates a body, said housing comprising an inlet communicating with the oil inlet of the body, and with an outlet communicating with the oil outlet of the body.

15. The internal combustion engine according to claim 14, wherein the housing comprises a cup-shaped body and a bonnet, which is fixed to said cup-shaped body so as to enclose the body.

16. A lubricating oil filter assembly comprising:
   a lubricating oil filter assembly for an internal combustion engine, comprising:
      an oil inlet;
      an oil outlet;
      a conduit connecting the oil inlet to the oil outlet;
      a chamber located in the conduit suitable for accommodating a filter element, the chamber in communication with the oil inlet and with the oil outlet; and
      a valve assembly including the filter element arranged within the conduit and having a spring that is arranged so as to bias the valve assembly towards a closing position that hydraulically separates the oil inlet from the oil outlet such that the lubricating oil does not flow therethrough when the lubricating oil is at the first pressure; the valve assembly movable to an opening position that reveals a passage directly connecting the oil inlet to the oil outlet so that the pressure of the lubricating oil inlet pushes the valve member towards the opening position such that the lubricating oil flows therethrough when the lubricating oil at the inlet is at a higher pressure;
   wherein the conduit is configured to bypass the chamber such that a bypass pathway is formed internal to the lubricating oil filter assembly.

* * * * *